Aug. 15, 1967

B. F. SILVERWATER 3,335,863
DIFFERENTIAL PRESSURE INDICATORS OF CONTROLLED RESPONSE
TO FLOW SURGES AND FILTER ASSEMBLIES INCLUDING THE SAME

Filed Dec. 23, 1963

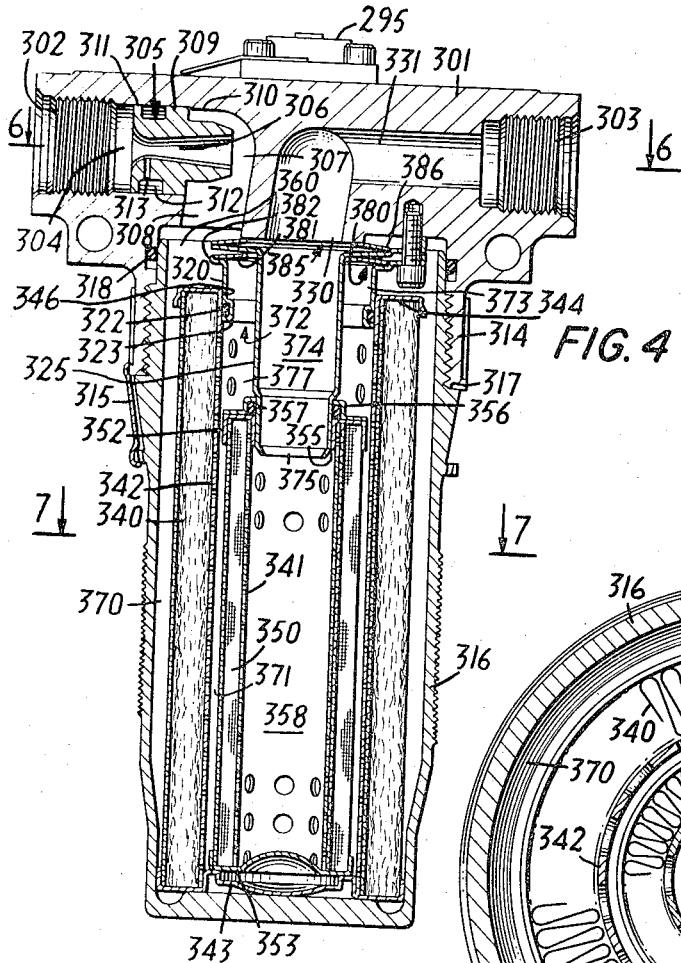
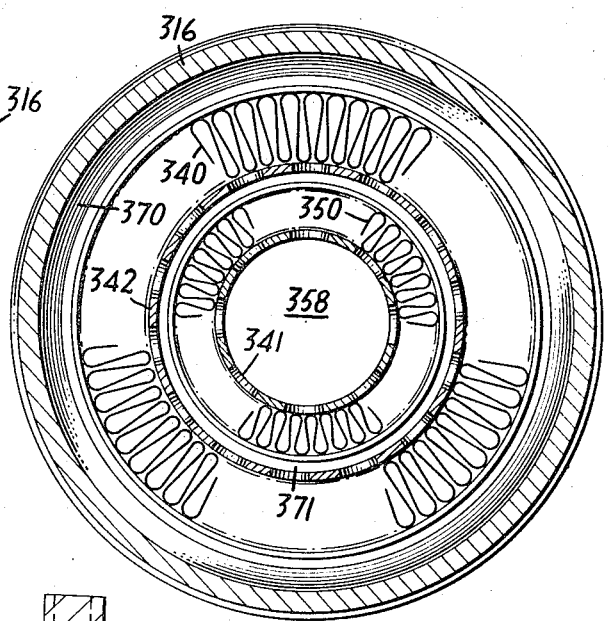
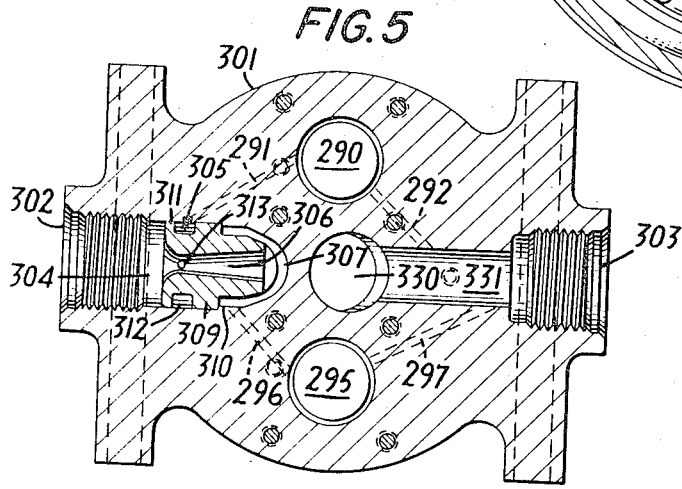

United States Patent Office 3,335,863
Patented Aug. 15, 1967

3,335,863
DIFFERENTIAL PRESSURE INDICATORS OF CONTROLLED RESPONSE TO FLOW SURGES AND FILTER ASSEMBLIES INCLUDING THE SAME
Bernard F. Silverwater, Plainview, N.Y., assignor to Pall Corporation, Glen Cove, N.Y., a corporation of New York
Filed Dec. 23, 1963, Ser. No. 332,683
11 Claims. (Cl. 210—90)

This invention relates to differential pressure indicators of controlled response to flow surges and filter assemblies including the same, and more particularly to differential pressure indicators and filter assemblies especially designed for use with fluid systems wherein sudden flow surges are encountered, such as the hydraulic systems of aircraft.

So many extraordinary demands are made upon the hydraulic systems of aircraft, that the surprising thing is not that there is an occasional failure, but that the systems are as effective as they are. The hydraulic fluids used must withstand temperatures ranging from −65° F. to as high as 275° F., and occasionally even higher, and must be completely flowable and operative in the system under these conditions. This means that they must be kept clear of small particles, and this requires an efficient filter system.

As the fine particles which cause wear and abrasion are filtered out of the hydraulic system, the filters become partially obstructed, and eventually, completely clogged. It is important to know when this occurs, as otherwise malfunction or injury to the controls, pumps or other components of the system might result, causing interruption of the flow of fluid, with serious consequences to the aircraft. Indication of filter clogging is normally provided by a differential pressure indicator responsive to a predetermined pressure differential across the filter element.

In normal flight of aircraft, a flow of hydraulic fluid of the order of 0.5 to 5 gallons per minute or less is required to operate various equipment, such as the controls, but whenever the landing gear is operated, a higher flow rate of the order of 7 to 30 gallons per minute is required. Such sudden flow surges can be accommodated, but may lead to accidental actuation of the pressure indicator designed to indicate abnormal pressure drop in the system. Pressure indicators are not capable of differentiating between pressure drops due to surges in flow, and therefore can give false indication of filter clogging or other monitored condition, during periods of peak flow demand.

In accordance with the invention, a differential pressure indicator is provided that is less sensitive or even insensitive to flow surges, and yet detects any changes in static pressure due to a change in flow resistance across a filter element or between any two points in the same or different systems. Alternatively, it is possible in accordance with the invention to provide differential pressure indicators which have an increased sensitivity to flow surges.

A changed or controlled response to flow surges is obtained by combining the indicator with a response control or converting means adapted to interchange velocity head and static head, and thus alter the static pressure component by an amount proportionate to the change in the velocity head component of the flow surge. One of the fluid lines leading from the pressure indicator is connected with the response control means by tapping the zone thereof of greatest changed static head in a manner to respond only to the changed static pressure component. Such response can be obtained by any of several techniques, including design of the response control means, and the design of the fluid circuit between the response control means and the pressure indicator. Furthermore, a valve can be combined with the response control means to isolate the pressure indicator from the fluid system, thus rendering the indicator insensitive to flow surges.

For simplicity, in the ensuring discussion, the term "Δ static head" will be used to refer to the changed static head it is the objective o fthe invention to create, the term "Δ static head zone" or "Δ zone" will be used to refer to the zone of the response control means wherein the change in static head is the greatest and the terms "Δ static head zone tap" or simply "Δ tap" will be used to refer to the line leading from the response control means Δ static head zone to the pressure indicator.

It will presently be seen that a given design of response control means can be employed either to increase or to decrease sensitivity of the pressure indicator to flow surges, merely by appropriate selection of the line leading from the indicator to the Δ static head zone tap of the response control means.

A response control means designed to change static head into velocity head, i.e., to increase the velocity head, with a correspondingly lower static head, offers a reduced cross-sectional area to fluid flow in the line. In the usual case, such converting means will take the form of an orifice which considerably, and preferably smoothly, increases velocity at the section of reduced cross-sectional area. The orifice preferably is in the form of a venturi which efficiently increases velocity at the throat, and efficiently reconverts the velocity head to static head in the expanding section beyond the throat thus minimizing the total pressure drop across the response control means, and the Δ static head zone in that case is tapped preferably at the point of maximum velocity.

The responsive control means can also be designed to change velocity head into static head, i.e., to decrease the velocity head, with a correspondingly higher static head. Such means offers an increased cross-sectional area to fluid flow in the line. Such converting means will take the form of an enlarged or bulbous portion or chamber, which considerably, and preferably smoothly, reduces velocity, with a consequent proportionately greater static head, and the Δ static head zone is tapped preferably at the point of minimum velocity. The transition from the zone of normal cross-sectional area exposed to flow to the increased cross-sectional area available to flow within the converting means should, in this embodiment, preferably be sufficiently gradual to minimize the total pressure drop across the response control means.

The total pressure in a fluid is the sum of the static head and the velocity head. Hence, a change in the velocity head at any point will result in a corresponding inverse change in the static head at that point. This change is proportional to the square of the velocity. This invention is based on this principle.

In the case of an orifice or venturi type response control means, when the flow rate increases, the velocity of flow at the Δ zone of the orifice or venturi increases, and results in a reduction in static pressure at the Δ zone thereof which is communicated by the Δ tap to the high or to the low pressure side of the pressure indicator, which responds only to changes in static pressure. Thus, in this case, an increase in flow volume is made to evidence itself, so far as this side of the pressure indicator is concerned, as an increase in velocity head and a decrease in static head.

In the case of a bulbous or expanded-type response control means, when the flow rate increases, the velocity of flow at the Δ zone increases, and results in a relative increase in static pressure there, which is communicated by the Δ tap to the high or low pressure side of the pressure indicator. Thus, in this case, an increase in flow volume is made to evidence itself as an increase in static head.

It is now possible to understand how the design of the fluid circuit between the response control means and the pressure indicator can be used to control sensitivity of response of the pressure indicator. In the case of a differential pressure indicator requiring connection of two taps or lines leading from the high and low pressure sides of the indicator to the fluid system, if the pressure indicator is to be more sensitive to flow surges in the line, the high pressure side of the pressure indicator will be connected to the fluid line upstream of the orifice or venturi-type response control means, and if the pressure indicator is to be less sensitive to flow surges in the line, the low pressure side of the pressure indicator will be connected to the fluid line downstream of the orifice or venturi. The remaining position selected in the line will be determined by the points across or between which the pressure differential is to be detected and a signal or indication given. If the indicator is to be used to detect and/or measure flow surges, the remaining position should preferably be immediately downstream of the response control means.

The above-indicated connections are exactly the reverse, in the case of a bulbous or expanded-type response control means, inasmuch as the conversion effected by the control means is exactly the reverse.

In either case, the pressure indicator is designed to be actuated whenever the differential in static pressure between the Δ tap and the other desired point in the system reaches a predetermined value.

It will of course be understood that when only one fluid line connection is required for the pressure-indicator, as in the case of a gauge, or an indicator one side of which is open to the atmosphere, that line connection will be made to the Δ tap of the response control means.

The differential pressure indicator of the invention comprises, in its broadest aspect, a housing, first fluid duct means associated with the housing communicating with a first source of fluid pressure, second fluid duct means associated with the housing communicating with a second source of fluid pressure, indicating means mounted in the housing for movement to and from an indicating position and responsive to changes in pressure between the two fluid duct means, and response control means associated with one of said fluid duct means for interchanging velocity head and static head and communicating only static head to the indicating means.

The indicating means mounted in the housing can be any of those well-known in the indicator art. The preferred form is the magnetic form disclosed in U.S. Patent No. 2,942,572, dated June 28, 1960, to David B. Pall. This device comprises a piston means movably mounted in the housing, first magnetic means movable with the piston means toward and away from a first position, bias means urging the piston means in one direction and normally retaining the first magnetic means in the first position, fluid duct means communicating with a source of fluid under pressure and with one end of the piston means to urge it in the opposite direction, second magnetic means movable toward and away from the first magnetic means and normally retained toward the first magnetic means by magnetic attraction when the first magnetic means is in the first position, and bias means urging the second magnetic means away from the first magnetic means selected to overcome the force of magnetic attraction when the first magnetic means is more than a predetermined distance away from the second magnetic means.

Also useful are the diaphragm type devices described in U.S. Patent No. 3,077,176, to D. B. Pall et al., dated Feb. 12, 1963. These devices include a flexible magnetic diaphragm assembly movably mounted in the housing, toward and away from a first position, bias means urging the diaphragm assembly in one direction and normally retaining the same in the first position, fluid duct means communicating with a source of fluid under pressure and with one face of the diaphragm assembly to urge it in the opposite direction, magnetic means movable toward and away from the magnetic diaphragm assembly and normally retained toward the assembly by magnetic attraction when the assembly is in the first position, and bias means urging the magnetic means away from the assembly selected to overcome the force of the magnetic means when the assembly means is more than a predetermined distance away therefrom.

Also useful are the types of indicating means disclosed in U.S. Patents No. 3,022,764, dated Feb. 27, 1962, to Scavuzzo et al.; No. 3,042,076, dated July 3, 1962, to Scavuzzo; No. 3,043,262, dated July 10, 1962, to Gruner, and No. 2,843,077, dated July 15, 1958, to Leefer. Conventional differential pressure gauges such as, for example, Bourdon gauges, bellows or diaphragm gauges, and U-tube manometers are also suitable indicators.

This invention also provides a filter assembly including such pressure indicators, arranged to detect an unusual pressure condition in the system, such as an unusual pressure drop across the filter. Such assemblies comprise a housing having inlet and outlet passages, a filter element disposed in the housing in a manner to receive fluid for filtration from the inlet passage, and deliver filtered fluid to the outlet passage, response control means disposed in the line of flow from the inlet passage to the filter element for interchanging velocity head and static head, a differential pressure indicator, first fluid duct means associated with the response control means and communicating static head at said response control means to the pressure indicator, second fluid duct means communicating with a passage downstream of the filter, indicating means mounted in the indicator for movement to and from an indicating position and responsive to changes in pressure between the two fluid duct means, said first fluid duct means communicating only static head to the indicating means, whereby the indicator detects changes in pressure across the filter element and has a lessened sensitivity to flow surges.

A preferred embodiment of filter assembly that is provided is intended for use in hydraulic systems for aircraft systems especially subjected to flow surges whenever increased demands are made upon the system, as in the operation of landing gear. This assembly is capable of removing a substantial proportion of very fine particles, as small as 0.05 micron, as well as nearly all incident particles over 0.45 micron in diameter, and all incident particles over 3 microns in diameter, and is capable of supplying a flow rate as high as may be desired upon demand. A filtered flow is provided at all flow rates, but at flow rates in excess of a predetermined maximum, only a portion of the flow is filtered through the primary filter element, of low micron removal rating, capable of removing all particles as small as 3 microns in diameter. The remainder is diverted by a flow control valve through a secondary filter of normal flow capacity and high micron removal rating, capable of removing most of the incident particles as small as particles 1.5 microns or larger in diameter, and all incident particles over 15 microns. The normal flow through the primary element is the maximum required, plus a safe margin, for normal operational flow in the system in which the element is installed. Only when extraordinary flow requirements are made, beyond this maximum, does the flow control valve divert the incremental portion of the flow through the secondary (coarse or high micron removal rating) filter element. Since such extraordinary flow requirements are usually made only for short periods, less than 2 to 3% of the total flight time, the filter assembly of the invention effectively keeps the hydraulic fluid substantially free of particles larger than 0.45 micron in diameter, since any such particles that may enter the fluid during the times of extraordinary flow are removed later in the course of normal flow.

As a further feature, this filter assembly of the invention provides for maintenance of a filtered flow through the secondary or coarse filter element whenever the primary element is clogged or so obstructed that the flow-through results in a pressure differential across that element above a predetermined value. In this event, the flow control valve provided diverts through the secondary filter element flow above that which the partially or fully clogged primary element can pass.

A second by-pass as an optional feature is provided for the secondary filter element, so that when this element becomes clogged, or so obstructed as to increase the pressure differential across it to have a predetermined minimum, then all flow through the filter by-passes both the primary and the secondary filter elements. Normally, there is ample time after the primary element has become obstructed for the filter element to be serviced before the secondary filter element becomes clogged. Thus, the second by-pass line would come into use only in the event of an emergency of rather unusual character.

In certain systems, intolerant of any contaminant above 15 microns, it will be preferable to omit the by-pass valve around the secondary element, in which event the secondary element is preferably fabricated with internal support such that it will withstand full system pressure as a differential pressure across it.

Pressure indicators in accordance with the invention indicating the reaching of a predetermined pressure differential can be provided across the primary filter element and/or across the secondary filter element, so that an indication is given to the operator that the primary or secondary filter element or both have become clogged, and require servicing.

For control of the diversion of fluid from the primary filter element at flow rates above the predetermined maximum, as well as diversion whenever the primary filter element becomes obstructed so that the pressure differential across it reaches a predetermined minimum, there is preferably provided a flow control valve, so designed as to be actuated by an increase in the velocity of flow through the valve. Since this increase in velocity is proportional to the amount of fluid and therefore the pressure of fluid applied on the inlet side of the valve, the valve is responsive to change in flow volume and consequently to changes in flow demand made upon the filter assembly of the invention. This valve is placed in the line of flow between the inlet to the filter assembly, and the primary filter element. Preferably, the valve is placed in an inlet passage.

In another embodiment, the flow valve comprises a valve of the orifice or venturi type, limiting flow through to a maximum value, in combination with a pressure-sensitive valve so designed as to be actuated by an increase in the velocity of flow through the orifice or venturi valve. Since this increase in velocity is proportional to the amount of fluid, and the resultant static pressure on the enclosed chamber side of the valve is reduced in proportion to the square of the velocity, the resultant static pressure difference between the inlet and chamber sides of the pressure-sensitive valve actuates the valve, which results in the pressure-sensitive valve being responsive to changes in flow volume and consequently to changes in flow demand made upon the filter assembly of the invention. The orifice or venturi valve is placed in the line of flow between the inlet to the filter assembly and the primary filter element, and preferably, in an inlet passage, while the pressure-sensitive valve is placed in the line of flow between the inlet and the secondary filter element.

The orifice or venturi valve has an orifice or throat such as a venturi considerably reducing the diameter of the passage available for flow, such as in the inlet passage, and as a consequence of this reduction in diameter, the velocity of flow through the valve orifice increases. A small hole or passage communicates the low static pressure at the venturi throat to a closed pressure chamber on one side of the pressure-sensitive valve, which is desirably in the form of a Belleville washer or spring disc, forming one wall of the chamber, and within which the washer or disc deflects between open and closed positions. The other side of the pressure-sensitive valve, such as the washer or disc, is exposed to fluid pressure in the inlet line. The valve is biased in the closed position, and remains stationary, in position against the valve seat, whenever the force against it due to fluid flow or pressure at the inlet side is less than the force in the opposite direction, which is the total of the force exerted by the fluid pressure in the closed pressure chamber and the biasing force holding it in the closed position.

The pressure-sensitive valve is so positioned in the fluid line, such as the inlet passage, as under normal flow conditions to close off a line leading to the secondary filter element. The result is that all flow must pass through the orifice or venturi valve into the primary filter element. At a predetermined pressure differential in static pressure between the valve face on the inlet side of the pressure-sensitive valve, and the pressure chamber on the other side of that valve, the minimum value of which is determined by the flow requirements of the system, the valve is actuated in a manner to open the passage between the inlet and the secondary filter element.

In still a third embodiment the flow valve comprises an orifice yielding a predetermined pressure drop, and a pressure-sensitive annular spring disc valve so designed as to be actuated by an increase in fluid pressure due to an increase in the velocity of flow to the filter assembly. The flow through the orifice is limited to a maximum value, and an increase in flow beyond this maximum results in a predetermined fluid pressure differential which results in opening the pressure-sensitive annular spring disc valve. Since this increase in fluid pressure is proportional to flow, the annular spring disc valve is responsive to changes in flow volume, and consequently to changes in flow demand, made upon the filter assembly of the invention.

The orifice is placed in the line of flow between the inlet to the filter assembly and the primary filter element, and preferably, in an inlet passage, while the annular spring disc valve is placed in the line of flow between the inlet and the secondary filter element.

A preferred embodiment of flow valve comprises structurally a poppet, reciprocatingly mounted in a closed pressure chamber and spring-biased against a valve seat in a position to close off a line to the secondary filter element, and a constricted flow passage through the poppet in the form of an orifice or venturi connecting the inlet with the passage leading to the primary filter element in all positions of the valve, and connected at the orifice or venturi to the pressure chamber. The pressure exerted by the compression spring against the poppet can be adjusted as required, and the dimensioning of the orifice or venturi is matched with the compressive force of the spring, and the dimensioning of the pressure chamber and surface area of the poppet exposed therein to fluid pressure, so as to obtain actuation of the valve poppet at the predetermined pressure differential in static pressure across the orifice.

While spring biasing means is preferred, magnetic, electrostatic or electromagnetic biasing means can also be used. In the case of magnetic or electrostatic means, twin magnets can be used, at each extremity of reciprocation of the poppet, and the poppet itself can be magnetic, oriented so as to be attracted to the magnet holding the poppet in the closed position and repelled by the magnet holding the poppet in the open position, and both magnets are so placed that the poppet at each extremity is within the field of both magnets. Thus, reseating of the poppet in the closed position is ensured when the flow is returned to normal. In the case of electromagnetic biasing means, the coil windings can be varied to provide the required biasing forces.

The valve poppet can also be and in a preferred embodiment is designed to be actuated by a fluid pressure against the inlet face of the orifice, whenever the pressure drop across the primary element reaches a predetermined maximum. This is done by shaping the inlet face of the valve poppet to a larger surface area in the pressure chamber and facing the passage on the outlet side of the poppet. Thus, whenever the fluid pressure on the inlet face exceeds the pressure in the passage closed off by the poppet by a predetermined amount, the valve poppet is actuated, just as in the case of a predetermined excessive static pressure differential.

Thus, the valve can be designed to actuate, in the preferred embodiment, whenever the fluid's passage through the primary filter element becomes obstructed, so that the total pressure differential between the inlet passage and the passage to the secondary filter element across the poppet exceeds a predetermined maximum. Thereupon, the valve poppet is actuated, exposing the line to the secondary filter element, by-passing the primary element, and filtered flow continues by way of the secondary filter element, on an emergency basis until the primary element can be serviced.

Thus, the same valve can serve to control flow through a secondary filter element in case of temporary need, when an excessive flow is needed beyond normal requirement, or in case of plugging or obstruction to a flow-reducing degree of the primary filter element.

In all of the above-described embodiments, it will be noted that the flow control valve includes an orifice or throat such as a venturi considerably reducing the diameter of the passage available for flow, such as in the inlet passage. Such flow valves accordingly can also serve as the response control means of this invention for interchanging velocity head and static head, inasmuch as this constriction constitutes a $\Delta$ zone. Furthermore, the line provided at this constriction in these valves can serve as the $\Delta$ tap communicated to control response of the differential pressure indicator, so as to make the indicator more or less sensitive to flow surges. One of the fluid duct means for the differential pressure indicator, in such a case, can then connect with the $\Delta$ tap to communicate only the changed static pressure to the indicating means.

The valve employed with or as a part of the response control means to isolate the pressure indicator from the fluid system can be of any type, such as a poppet valve, a Belleville washer, a solenoid valve, a pilot-operated gate valve, or any of the other types of valves known to the art.

The response control means, and also the flow valve or shut-off valve, can be constructed of any durable material inert to the fluid being circulated through the system. Metals such as aluminum, stainless steel, and other stainless alloys are preferred, but it is also possible to use synthetic polymers and cellulose derivatives, such as polytetrafluoroethylene, polypropylene, polyethylene, polystyrene, polycarbonates, nylon, polyoxymethylene, acrylonitrile rubbers and fluorocarbon rubbers.

Those skilled in the art are aware of the parameters to be taken into account in determining the diameters of orifices or venturi passages, and bulbous or expanded passages. The exact dimensions for the response control means and abutting passages must be determined for each particular system, but this is readily accomplished by standard design and calculation.

The primary filter element of such filter assemblies is selected to meet the system requirements for incident particle removal. As has been stated, hydraulic systems of aircraft may require the removal of all incident particles as small as 3 microns in diameter. However, the primary filter element of the invention can remove a proportion of even smaller particles, down to 0.05 micron in diameter, or all of such particles, if required, or only considerably larger particles, if removal of such a high proportion of small particles is unnecessary. There is no upper limit, but filters having the ability to remove all particles of from 3 to 10 microns are generally useful.

As the primary filter element, any filter material can be employed. Sheet filter material can be used, such as porous sheets made of sintered particulate material, and wire mesh and sinter-bonded wire mesh, disclosed in U.S. Patents Nos. 2,925,650 and 3,049,796 in which the wires or particles are made of metals or natural or synthetic plastic materials, such as stainless steel, aluminum, ceramic materials, polyvinyl chloride, polyethylene, polypropylene, polystyrene, and polytetrafluoroethylene.

For removal of all incident particles as small as 3 microns in diameter, the primary filter element should have a microporous structure in which no pore is larger than about 10 microns, and the microporous structure should have a high voids volume, preferably of at least 75%. A preferred microporous sheet material for use in the manufacture of the primary filter element is a bat or sheet having deposited therein or thereon and bonded thereto a layer having the desired ultrafine or microporous dimensions and voids volume. Preferred embodiments of microporous materials are described in U.S. patent application Ser. No. 215,151, filed Aug. 6, 1962, now Patent No. 3,246,767, and have a maximum pore diameter of less than about 10 microns and an average pore diameter of about 0.005 to 3 microns. Also useful are the microporous materials prepared in accordance with U.S. patent applications Ser. Nos. 74,130, filed Dec. 6, 1960, now Patent No. 3,158,532, and 98,595, filed Mar. 27, 1961, now Patent No. 3,258,056.

Because filter materials having such small particle removal ratings have a relatively low flow capacity, it is preferred to form the primary filter element in pleats, convolutions or corrugations, so as to provide a greater surface area in a small volume. The secondary filter element is selected primarily for flow capacity, so as to pass the required volume of fluid per unit time under the maximum flow demands of the system, and is preferably also selected so as to give the lowest incident particle removal ratings obtainable at such flow capacity.

The particle removal rating of the secondary filter element is in no way critical, and can range from 5 to 50 microns or higher, depending on the system parameters. Particles passed in flow through the secondary filter element are only temporarily in the system in any event, since the primary filter element is due to plugging of the primary filter element.

If the primary element is made of material (for example, sintered powder, felt or paper) which may release particles or fibers from its downstream surface, the secondary filter should preferably be fine enough to remove all such particles or fibers.

Secondary filter elements are available, capable of removing 90% of particles larger than 1.5 microns in diameter, which have the required flow capacity. Such elements can be made of wire mesh, or of sinter-bonded wire mesh such as is described in U.S. Patents Nos. 2,925,650 and 3,049,796. Also useful are filter elements made of sinter-bonded metal particles, such as sheets of porous stainless steel and other stainless alloys, bronze, aluminum and steel. Any of the materials described above for use in the primary filter element can also be employed for the secondary filter element, but with a larger pore diameter so as to have a higher micron removal rating, for required greater flow capacity.

The secondary filter element also preferably is formed in pleats, convolutions or corrugations, for greater surface area.

FIG. 4 is a longitudinal section through a filter assembly in accordance with the invention showing the filter head and filter bowl and the elements disposed therein;

FIG. 5 is a cross-sectional view of the filter assembly of FIG. 4, taken along the lines 6—6 and looking in the direction of the arrows;

FIG. 6 is a cross-sectional view of the bowl portion of the filter assembly of FIG. 4, taken along the lines 7—7 and looking in the direction of the arrows;

Figure 1:
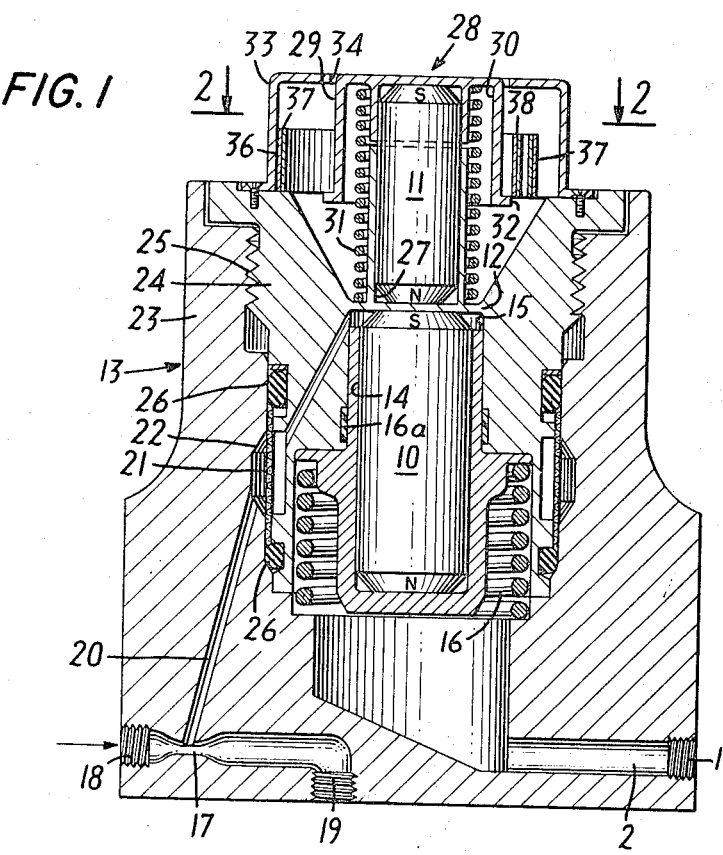
FIG. 1 is a view in longitudinal section taken through a typical pressure indicator according to the invention, having a decreased sensitivity to flow surges.
Figure 2:
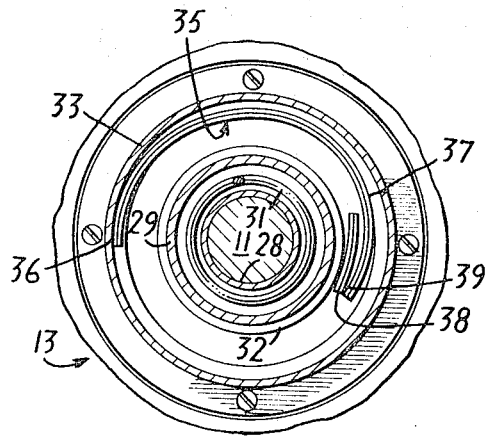
FIG. 2 is a sectional view taken on the lines 2—2 of FIG. 1, and looking in the direction of the arrows.

The pressure indicator of FIGS. 1 and 2 comprises two magnetic elements 10 and 11 coaxially mounted on opposite sides of a separating wall 12 within portion 24 of housing 13. The housing 13 may be separable through the enlarged area 22 into two portions 23 and 24 which are joined by screw threads 25, suitable glands 26 being provided to seal the enlarged area of the duct. Preferably, both the elements 10 and 11 are composed of permanently magnetized Alnico V alloy or the like and are positioned with opposite magnetic poles adjacent the wall 12 so that each is drawn toward the wall by the resulting force of attraction. If desired, however, only one of these elements need be a permanent magnet, and the other may be formed of suitable magnetic material, such as iron, for example.

Mounted in a tubular piston 14, the magnet 10 is slidably supported in a cylindrical bore 15 in the housing 13 and is urged toward the wall 12 by a coil spring 16. In order to prevent fluid from passing from one end of the bore 15 to the other, a liquid-tight seal is provided between the bore and the piston 14 by a ring 16a of Teflon or other suitable material. The coil spring 16 is selected according to the desired actuating pressure to permit the piston 14 to move downwardly in the bore 15 when the pressure at the upper end of the piston 14 exceeds that at the lower end by an amount equal to the actuating pressure.

The response control means for interchanging velocity head and static head is venturi 17 holding in the housing 13 and central venturi passage 17 converting static head to velocity head and constituting the Δ zone. An inlet line 18 communicates with one end of the venturi passage 17, and the other end of the passage opens into an outlet line 19. The inlet and outlet lines are fitted with suitable pipe connections. The Δ static head at the throat of the venturi 17 communicated via Δ tap 20 leading from the throat of the venturi to the end of the cylindrical bore 15 adjacent the wall 12. The other end of the bore is connected via downstream passage 2 and port 1 with a point in the line of fluid flow downstream of the device, depending on the points across which the differential pressure is being measured, such as between the upstream and downstream sides of a filter element.

The device as shown is less sensitive to flow surges. A device more sensitive to flow surges, and thus capable of detecting flow surges, is obtained merely by reversing the connections to Δ tap 20, so that line 2 and port 1 now connect to venturi 17 and passage 20 is connected to the fluid line upstream of the venturi 17.

The lines 18 and 19 can in many cases carry the entire flow volume passing through the system, but in the case of large flow volumes it may be desirable to provide a bypass line for the major portion of the flow, and restrict lines 18 and 19 to a minor proportion of the flow. In this way, the indicator housing dimensions can be standardized, and still be capable of meeting the flow volume requirements of any system.

In order to prevent dirt carried by the incoming fluid from reaching the bore 15, and to make certain that any fluid which might pass into or through the bore 15 to the outlet line 2 is clean, a suitable filter element 21 may be inserted in an enlarged portion 22 of the duct 20. This element is not essential, and can be omitted, particularly if the system includes a filter at another point. As shown in FIG. 1, the enlarged portion 22 may, for example, be a ring-shaped cavity in the housing portion 23 surrounding one of the magnetic elements. Within this cavity, the annular filter element 21 is inserted, thereby providing a high dirt capacity with low resistance to fluid flow.

On the other side of the wall 12, the magnetic element 11 is slidably received at one end in a bore 27 coaxial with the bore 15. Secured to the opposite end of the magnet 11 by a press fit, for example, a cap 28 includes a tubular wall 29 extending toward the housing 24 and radially spaced from the magnet. The annular recess 30 thus formed receives a coil spring 31 which extends from the cap 28 to the housing 24 to urge the cap and the magnet 11 away from the wall 12. This spring is selected so that it is retained in the stressed condition with the magnet 11 against the wall 12 by the attractive force of the two magnetic elements as long as the adjacent poles of the two magnets are separated by less than a predetermined distance, for example, one-sixteenth of an inch. Whenever the magnetic element 10 is moved away from the element 11 so that their adjacent poles are separated by more than a sixteenth of an inch, however, the decreased force of magnetic attraction resulting therefrom is overcome by the force of the spring 31 and the cap 28 and element 11 are driven away from the wall 12.

In order to prevent the magnet 11 from being driven completely out of the bore 27, the tubular wall 29 terminates in a radial flange 32, and a drum 33, having a central aperture 34 slightly smaller than the flange 32 but large enough to permit the cap 28 to pass through it, is mounted on the housing 24. Also, a conventional bimetallic element 35 is mounted at one end on the inside surface of the drum 33 as by a weld 36. As best seen in FIG. 2, the bimetallic element is preferably comprised of two arcuate strip portions 37 and 38 joined by a weld 39 and both arranged to bend inwardly with decreasing temperatures. At normal temperatures, the element 35, which is adjacent the wall 29 and just above the flange 32 when the indicator is not actuated, has a minimum radius greater than that of the flange 32 and permits the cap 28 to rise through the aperture 34 on actuation. However, at temperatures below a preselected value at which the viscosity of the fluid to be filtered rises appreciably, for example, 32° F., the element 35 contracts inwardly so that the inner strip 38 extends over the flange 32, thus preventing actuation of the pressure indicator.

In operation, fluid under pressure enters venturi passage 17 from port 18, emerging at port 19. As a consequence of the reduction in diameter at the venturi passage, the velocity of flow through the venturi throat is higher. Hence, the velocity head is increased at that point, resulting in a decrease in the static head at that point. When the flow volume and hence flow rate increase, as in the case of a flow surge, the velocity of flow through the venturi increases, and results in an actual reduction or only in a small increase in static pressure in the Δ zone at the venturi, as compared to a point in the line before the Δ zone. Hence, the static pressure which is communicated through Δ tap 20 to the bore 15 decreases, or is only slightly greater, and the force tending to hold the piston 14 stationary is in fact not increased to a value high enough to push the piston 14 downwardly. The piston 14 is designed to be actuated only whenever the static pressure differential across the piston 14 is increased to beyond a predetermined value, and this value cannot ordinarily be reached by a mere surge-induced increase in flow rate at the venturi 17.

Nonetheless, the indicator responds to the situation it is required to detect, in the following manner. A blocking of a filter beyond the venturi, for example, gives a resultant increase in total pressure at the venturi, which is communicated via Δ tap 20 to the top of the piston 14 as an increase in static pressure. As the pressure difference across the piston 14 increases, the magnet 10 and the piston 14 are urged downwardly against the force of the spring 16 and the pressure from the downstream line 2. When the force due to the difference between the upstream and downstream pressures exceeds the force of the spring 16, the piston 14 is driven downwardly in the bore 15. After the piston 14 and magnet 10 has moved to a position more than one-sixteenth of an inch away from the magnet 11, the attractive force between the two magnets become less than the force of the spring 31, and the magnet 11 is driven away from the wall 12 until the flange 32 abuts the inside surface of the drum 33. Thus, the cap 28, which, if desired, may be of a suitable eye-catching color such as red, rises through the aperture 34 to indicate that the pressure difference is greater than the predetermined value in accordance with which the spring 16 has been selected. As an example, the spring 16 may be arranged to permit the piston 14 and magnet 10 to be driven away from the wall 12 when the pressure difference exceeds 35 p.s.i., and return when the pressure is less than 25 p.s.i.

It will be apparent that by suitable dimensioning of the drum 33 and the radial flange 32, the magnet 11 may be permitted to move more than one-sixteenth inch from the normal position of the magnet 10. In this case, the pressure indicator must be reset by manual depression of the cap 28. On the other hand, if the flange 32 is positioned to stop the magnet 11 less than one-sixteenth inch from the normal position of the magnet 10, the indicator will be automatically reset by the attractive force of the magnets, which is greater than that of the spring 31 at this distance, when the magnet 10 is returned to the wall 12.

At temperatures below 32° F., for example, the thermostatic element 35 contracts to move the inner end of the strip 38 over the flange 32. Thus, when the piston 14 and the magnet 10 are moved away from the wall 12 by pressure resulting from increased viscosity of the fluid, the lower edge of the strip 38 intercepts the flange 32, preventing a false indication of filter clogging.

Figure 3:
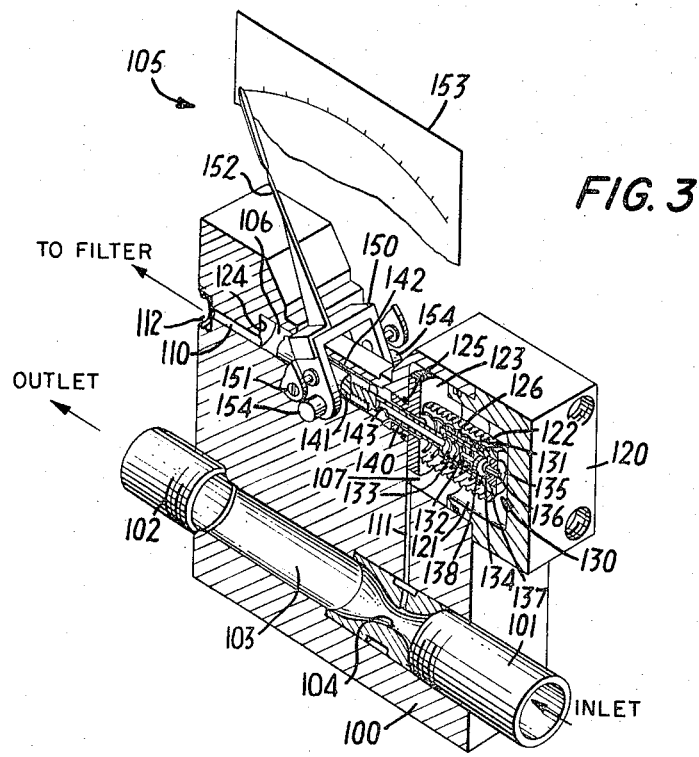
FIG. 3 is a view in longitudinal section through a differential pressure gauge embodiment of pressure indicator of the invention, having an increased sensitivity to flow surges.

The pressure or gauge indicator shown in FIG. 3 is designed to have a reduced sensitivity to flows beyond its capacity to indicate on the gauge, to prevent damage thereto at such times as might occur where the needle driven beyond the dial in a flow surge. The indicator comprises a housing 100 provided with an inlet port 101 and an outlet port 102 fitted with suitable pipe connections. Inlet port 101 leads to flow passage 103 which extends through the housing to the outlet port 102. The central flow passage 103 is provided with a venturi insert 104 constituting the response control means, and is the Δ zone wherein the diameter of the flow passage, and hence the cross-sectional area available for flow, decreases to a minimum. The portions of the flow passage 103 on each side of the venturi are preferably of the same diameter.

The Δ static pressure at the response control means is tapped by Δ tap 111 on the upstream side of the filter filter (not shown). The other end of Δ tap 111 is connected to the high pressure connection 107 of the differential pressure indicator, the gauge 105. Duct 110 communicates the static pressure downstream of the response control means on the other side of the filter to the low pressure connection 106 of the differential pressure gauge 105. The connection to the downstream side of the filter is not shown, but is fitted to part 112 of duct 110.

The differential pressure gauge assembly 105 comprises a chamber 121 within which is positioned a bellows 122 made of metal or other suitable material. One end of the bellows is fastened to bushing 123 by, for example, an adhesive or solder, and the bushing with the bellows attached is threadably mounted within bore 124 so as to seal off the bore 124 from that portion of the chamber on the outside of the bellows. To ensure a liquid-tight seal between the bore 124 and the chamber 121 (an O-ring seal 125 is provided. Thus, the bellows is free to expand and contract within the chamber 121, and is normally retained in the expanded position by coil spring 126 mounted within the bellows.

The other end of the bellows is closed off from bore 124 by a relief valve assembly 130. The relief valve assembly comprises, in combination, a housing 131, a valve poppet 132, a valve spring 133, a valve seat 134 and a cap piece 135. The housing 131 may be made of any suitable metal or plastic, such as brass, aluminum, steel, stainless steel, polyethylene or polytetrafluoroethylene, and is inserted (soldered or resin-bonder) within the end of the bellows 122 and is closed off by the cap piece 135 having a central hole 136. The cap piece is retained in position by the bushing 137 threadably mounted on the outside of the bellows.

The valve poppet 132, made of brass, aluminum or other suitable material, is mounted within the housing in a manner free to move toward and away from the cap piece 135, and is urged toward the cap piece by the valve spring 133. The valve spring at one end abuts the housing and, at the other end abuts a radial flange 138 on the valve poppet 132. Inserted within a radial groove on the inner face of the cap piece 135 surrounding hole 136 is a valve seat 134 of an elastomeric material, such as, for example, natural rubber, neoprene, Buna N, Buna S or other natural or synthetic elastomeric material, so that when the valve poppet 132 is in contact with the cap piece 135, a liquid-tight seal is obtained between the radial flange 138 on the valve poppet 132 and the cap piece. Any elastomeric material inert to the fluid in the system at the temperatures encountered may be used. A portion of the poppet valve 132 projects through the hole 136 in the cap piece 135, so as to be exposed to the pressure within chamber 121.

Threadably mounted within a hole in the end of the relief valve housing 131 nearest bushing 123 is a hollow rod 140. The other end of the rod projects through the bushing 123, and is threadably mounted to the driver magnet 141, made of a suitable magnetic material such as Alnico V alloy or the equivalent. The driver magnet is free to reciprocate within the bore 124, and to ensure that there will be no pressure differential between the ends of the magnet to restrict such motion, the driver magnet has grooves 142 along its edge from end to end. The pressure on the inside of the rod is communicated to the portion of the bore 124 nearest the bellows by port 143.

Also mounted within the housing is a saddle shaped yoke 150 pivotally supported on bearings 151. Affixed to the central portion of the yoke is a pointer 152 adapted to swing through an arc and give an indication of differential pressure which may be read from the dial 153. Also affixed to the yoke are two follower magnets 154, one on each side of the yoke below the pivots.

The bore 124 is connected to the flow passage 103 by Δ tap 110, which thereby communicates the static pressure at the Δ zone of the verturi 104 to the bore 124. Chamber 121 is connected by duct 111 to the passage 103, which thereby communicates the static pressure there upstream of the venturi to chamber 121.

In operation, fluid enters the indicator at port 101 and flows through the flow passage 103 to the response control means 104. As the diameter of the flow passage within the response control means is less than that of the flow passage, the fluid velocity through the response control means increases. Hence, the velocity head increases, and the static head decreases by an amount proportionate to the square of the velocity.

At normal flow rates, the velocity head of the fluid entering passage 103 would usually be small in relation to static head. Therefore, the change in velocity head at the response control means would also be small, and the differential between the static heads communicated to the differential pressure gauge by Δ tap 111 and duct 110 would therefore be substantially the pressure drop across the filter, an indication of the degree of clogging.

However, in the event of a flow surge, the velocity head in flow passage 103 would increase, and this increase would be accentuated at venturi 104, causing a compensating and amplified decrease in static head in Δ tap 111. Thus, the static head differential between Δ tap 111 and duct 110 would decrease sharply in the event of a flow surge, and this decrease would be communicated to the differential pressure gauge 105. The response control means 104 therefore decreases the sensitivity of the differential pressure gauge to flow surges, by converting static head to velocity head.

As indicated above, in the event of a flow surge, the difference in static pressure between Δ tap 111 and duct 110 decreases in the event of a flow surge. This is directly responsible for the decreased sensitivity to flow surges, as will be evident from the following.

The lower static pressure at the response control means 104 is communicated to the chamber 121, which is connected to the flow passage 103 by duct 111, in the differential gauge assembly 105, thereby decreasing the pressure therein relative to that in bore 124. As the pressure differential decreases, spring 126 expands and the bellows 122 opens in accordion fashion. As the bellows opens, the rod 140, affixed to the end of the bellows, is pulled up the bore 124 and the driver magnet 141, affixed to the rod 140, therefore also moves up the bore 124. The follower magnets 154 affixed to the yoke 150 are attracted to the opposite pole of the driver magnet. Therefore, as the driver magnet moves up the bore, the follower magnets, being attracted by the driver magnet, cause the yoke to swing in its pivots so as to enable the follower magnets to more closely approach the driver magnet. The swinging of the yoke, under the urging of the follower magnets, causes the pointer to swing through an arc, and the change in differential pressure due to and indicating the existence of the surge flow may then be read off the calibrated dial from the position of the pointer. If desired, the dial may be directly calibrated in terms of flow, rather than in terms of pressure, but in either event, the surge flow rate may be readily calculated from the differential pressure, using mathematical techniques and formulae well known to those skilled in the art.

When the flow surge has passed, the differential pressure between Δ tap 111 and duct 110 increases, compressing spring 126, and closing the bellows 122, thereby pushing the driver magnet down the bore 124. The movement of the driver magnet causes the follower magnets to swing, so as to reduce the distance between the driver and follower magnets. The pointer 152 therefore moves through an arc across the face of the dial 153, to show the normal differential pressure or flow rate across the filter.

In the event of an extremely high surge flow, the pressure difference between chamber 121 and bore 124 might be so great as to cause damage to the bellows 121. Therefore, the relief valve assembly 130 is provided to relieve such extremes of pressure. Whenever the pressure difference approaches a level at which injury to the gauge might result, the valve poppet 132 is moved away from its seat against the cap piece 135, thereby overcoming the force exerted by valve spring 133. Such movement of the valve poppet opens the hole 136 in the cap piece, to permit flow through the relief valve housing 131, the central hollow portion of rod 140 and port 143, thereby reducing the pressure differential between chamber 121 and bore 124.

Whenever the pressure differential returns to a safe level, either by passing of the surge flow or by flow through the relief valve assembly, the valve spring 133 urges the valve poppet 132 back against its seat, abutting the cap piece 135, and thereby closing the relief valve.

The filter assembly shown in FIGS. 4 to 6 comprises a head 301 provided with a threaded inlet port 302 and a threaded outlet port 303, fitted with suitable pipe connections. Port 302 leads to an internal passage 304. Inserted within passage 304 is a response control means for converting static head into velocity head and also serving as a flow control valve for diverting flow volumes in excess of a predetermined minimum from the primary to the secondary filter element. This means is in the form of a venturi insert 305 having a central venturi pasage 306 opening on its inlet side into inlet passage 304 and on the outlet side into passage 307. Passage 307 extends first laterally and then downwardly, leading to a port 308 in the lower face of the head.

Venturi insert 305 is provided with an outwardly extending ridge 309 which firmly seats against an inwardly extending constriction 310 within the passage 307 to position the venturi insert 309 within the inlet passage. If desired the venturi insert may be more securely positioned by bonding it in place by brazing, soldering, welding, or for example, by an adhesive such as an epoxy resin. Any bonding means can be used, so long as its adhesive properties are not adversely affected by the fluid being filtered at operating temperatures. The outwardly projecting inlet face of the venturi insert 311 and the ridge 309 define between them a static pressure chamber 312, circumscribed by the inner wall of the passage 304 within the head 301. This static pressure chamber is connected with the throat of the venturi passage by pasage 313, so that the static pressure within the chamber 312 is the same as that at the throat of the venturi.

Also provided in the head are two differential pressure indicators 290 and 295. Indicator 290 is of the magnetic type described in FIGS. 1 and 2, and since details are fully given in the description of these figures, such details need not be repeated here, but are incorporated by reference. Indicator 295 is also of the same magnetic type, but is not associated with the venturi pasage 306 as in accordance with the invention, although it could be, if desired, merely by connecting passage 296 to the static pressure chamber 312. Non-magnetic devices such as those disclosed heretofore are also suitable.

The primary differential pressure indicator 290 is connected by passage 291 to the static pressure chamber 312 and by passage 292 to the passage 331 leading to the outlet port 303. Thus, indicator 290 measures the differential pressure between the static heads at the throat of the venturi and at the outlet port of the filter unit.

The secondary differential pressure indicator 295 is connected by passage 296 to passage 307 at the outlet of the venturi, and by passage 297 to the passage 331 leading to the port 303, thus measuring the differential pressure across both the primary and secondary filter units.

The head 301 has a downwardly extending tubular portion 314 to which three cable clamps 315 are fastened by, for example, welding, brazing or soldering. The filter bowl 316 is inserted within the downwardly extending tubular portion 314 of the head 301 until the projecting flange 316 on the filter bowl abuts the tubular portion of the head. The bowl is securely held in position by the cable clamps which fit over a projecting lip 317 on the filter bowl. A leak-proof seal is provided between the filter bowl and the tubular portion of the head by means of the O-ring seal 318. Disposed within the filter bowl are a primary small particle removal rating filter element 340 and a secondary large particle removal rating filter element 350. The filter element 340 is formed of any filter material capable of removing 98% of all particles having a diameter as low as 0.45 micron. The element shown in the drawing is made of a preferred filter material, cellulose-base paper, epoxy resin impregnated, and coated with a blend of glass fibers, diatomaceous earth, and potassium titanate, prepared as described in U.S. applications Serial No. 98,595, filed Mar. 27, 1961, now Patent No. 3,258,056, and Ser. No. 215,151, filed Aug. 6, 1962, now Patent No. 3,246,767. Also useful are the filter elements described and claimed in U.S. application Ser. No. 74,130, filed Dec. 6, 1960, now Patent No. 3,158,532. The material is in corrugated form as is best seen in FIG. 7. The corrugations are supported both within and without by cylindrical perforated cores of sheet metal such as aluminum or stainless steel, the inner core being designated 341 and the outer core 342. Thus, both surfaces of the primary element 340 are supported and protected by a metal covering.

The assembly of the corrugated filter and the two cores is held between upper and lower end caps 343 and 344, respectively, each of the end caps being provided with a central aperture, the lower aperture being numbered 345 while the upper aperture is number 346. The lower aperture 345 is closed off by the bottom cap 343, which is bonded to the lower end cap by, for example, welding or brazing. The cap 343 has firstly an upwardly extending reentrant portion and secondly a downwardly extending dished section abutting the bottom of the filter bowl.

Bolted to the head 301 is a first adapter piece 320 extending downwardly, then inwardly, and downwardly again to form a tubular, downwardly extending, passage 321 within the filter bowl which fits within the upper aperture 346 in the primary filter element 340. A leak-proof seal between the first adapter 320 and the upper end cap 343 of the primary filter element is provided by the O-ring seal 322 which fits within a groove 232 formed in the lower, downwardly extending portion of the adapter 320. Thus the adapter 320 firmly positions the primary filter element 340 concentrically within the filter bowl. As a result the outer core 342, surrounding primary element 340, and the filter bowl 316 define between them the space 370 just inside the wall of the filter bowl. The port 308 of the head 301 opens into this space via passage 360 but the only normally available exit is through filter element 340. It is thus evident that fluid entering through the inlet 302, passages 304 and 307, and port 308 of the head through passage 360 into space 370 normally emerges from the bowl 316 by passing through core 342, the primary filter element 340, and core 341, in sequence.

The secondary filter element 350 is concentrically disposed within the inner core 341 at a point spaced therefrom, thereby defining a space 371 between the outer surface of the secondary filter element and the core 341. The secondary filter element is made of a sintered wire mesh, prepared in accordance with U.S. Patents Nos. 2,925,650 and 3,049,796, and having a surface of sinter-bonded fine metal powder in accordance with U.S. Patent No. 3,061,917. In this case both the sintered wire mesh and the metal powder are stainless steel. This element, which is also in corrugated form, is supported on a perforated metal cylinder core 351 of aluminum or stainless steel and the resulting composite welded to top and bottom end caps 352 and 353, respectively, in accordance with the process and structure of U.S. Patents Nos. 3,007,579 and 3,007,238. The bottom end cap 353 is closed. The top end cap 352 has a central opening 355. At the upper end cap is bonded a piece 356 which extends inwardly, then upwardly, and again inwardly to form a recess in which O-ring 357 is placed.

A second adapter piece 325 is also bolted to the head 301. As in the case of the first adapter 320, the second adapter also extends downwardly, then inwardly, and downwardly again to form a tubular passage 374 extending downwardly from the head 301 to port 375 opening at its lower end into the central aperture 355 in the top end cap 352 of the secondary filter element 350. The O-ring 357 provides a liquid-tight seal betwen the secondary filter element assembly and the second adapter 325, thereby isolating the space 358 within the secondary filter element and normally preventing access thereto except by passage of liquid through the secondary filter element. The secondary filter element assembly is supported at its lower end within the filter bowl upon the reentrant portion of the bottom end cap 343 of the primary filter element. The secondary filter element assembly is maintained concentric with the primary filter element by the second adapter 325, thereby defining the space 371 between the inner core 341 of the primary filter element and the outer surface of the secondary filter element 350. It is thus apparent that the fluid passing through the primary filter element normally exists from the filter bowl 316 by passing through, in sequence, the secondary filter element 350, the inner core 351, and thence into the space 358 within the secondary filter element.

The upper end of passage 374 within the second adapter piece 325, connects with port 330 in the lower face of the head 301 and thence to passage 331 which extends first upwardly and then laterally to the outlet port 303 in the head. The lower end of pasage 374 opens into the space 358 within the secondary filter element via port 375.

The second adapter 325 also serves as a space to hold the first adapter 320 away from the head, thereby allowing the first adapter to serve as the mount for the pressure-sensitive valve assembly 380, controlling access to the secondary filter element 350 directly from the space below passage 307. The by-pass valve assembly 380 is composed of an annular spring disc 381, available commercially as a Belleville washer or Belleville spring disc, supported at its outer periphery in a flange or recess 382 in the inwardly extending portion of the first adapter 320, and seating, at its inner periphery, against the underside of the inwardly extending portion of the second adapter 325. The spring disc 381 normally is in the position shown, bowed toward the adapter 325 and facing passage 360 leading to space 370 surrounding the primary filter element. The spring disc 381 forms a seal between the second adapter and the flange 382. Thus, with the spring disc 381 in the position shown, the space 371 between the primary and secondary filter elements is sealed off and access thereto can only be had via the primary filter element 340. Thus, fluid entering the filter unit most normally pass through both the primary and secondary filter elements. Whenever the spring disc 381 moves away from its seat against the second adapter 325, however, and this occurs at predetermined pressure differentials across the primary filter, i.e., between spaces 370 and 371, a path is opened from port 308 through passages 360 and 373, port 372 and passage 377 into space 371 and thence through the secondary filter into space 358, leaving the filter bowl at port 330 in the lower face of the head after passing from space 358 through port 375 and passage 374. Thus, such a flow bypasses the primary filter. This will occur only when the primary filter is clogged or when there is an increase in flow volume to beyond a predetermined minimum.

A relief valve assembly 385 is provided between passage 360 and passage 374, and comprises an annular spring disc or Belleville disc 386. The annular spring disc 386 is supported at its outer periphery in flange 387 on the upper surface of the second adapter 325. This spring disc seats against the lower face of the head 301, surrounding and sealing off port 330 from port 308 and passage 360 when the spring disc is in its normal position as shown in FIG. 5. Thus, when biased towards the head, as shown, fluid entering passage 360 through port 308 enters space 370, and can emerge from the filter unit only by passing through the primary filter element or via valve assembly 380 to space 371, and thence through the secondary filter element into space 358 and thence through port 375 into passage 374, leaving the filter bowl at port 330. Whenever the spring disc 386 moves away from its seat against the head 301, however, and this occurs at a predetermined minimum pressure differential between ports 308 and 330 in the head 301, that is greater than that at which disc 381 opens, a path is opened between passage 360 and passage 374, so that flow now by-passes both the primary and secondary filter elements. Such a flow is of course unfiltered, but occurs only in the event of an emergency or an extraordinarily large flow volume.

The various flow paths through this embodiment of the filter assemblies of the invention can now be understood.

Normally, at all flow rates below a predetermined maximum, say 5 gallons per minute, fluid to be filtered enters port 302, passes through passage 304 of the head 301, and then through the venturi passage 306 of the venturi insert 305 into passage 307, entering the filter bowl at port 308. The fluid entering the filter bowl at port 308 flows through passage 360 within the filter bowl and thence flows into the space 371 between the primary filter element and the inner wall of the filter bowl 316. It then passes through the exterior core 342 of the primary filter element, the primary filter element 340 and the internal core 341, emerging into the space 371 between the primary and secondary filter elements. Next, it passes through the secondary filter element 350 and the core 351 into the space 358 enclosed by the secondary filter element, emerging from the filter bowl through port 375 and passage 374 of the second adapter piece 325, leaving the filter bowl and reentering the head through port 330. The fluid next flows through passage 331 finally emerging from the filter assembly of the invention at the outlet port 303.

Inasmuch as the primary filter element 340 removes the small particles, and the secondary filter element 350 only the large particles, in this normal line of flow the secondary filter element provides no effective contaminant filtering action. It does, however, prevent migration of any materail that may become detached from the primary filter element 340, such as loose fibers or particles of bonding resin.

Thus, in normal flow the filter unit removes the maximum proportions of small particles and very few particles which have a diameter in excess of 0.45 micron will pass the filter unit. This efficient operation is obtained at all normal flow rates below the predetermined maximum at which pressure-sensitive valve 380 is actuated.

Whenever a higher flow volume is required in the system, the pumps operating the fluid will of course provide more flow, and the rate of flow of fluid to the filter unit at inlet 302 will increase. As the rate of flow into the filter unit increases, beyond the flow capacity of the primary filter element 340, whether this is due to clogging or to insufficient flow capacity, the predetermined pressure differential is reached at which the pressure-sensitive annular spring disc valve 381 is set to open, and the disc 381 moves away from adapter 325, its seat, thus exposing a passage for fluid flow directly to the secondary element 350. While this is occurring, flow continues through the primary element at its maximum capacity volume of, say 7 to 9 gallons per minute. Accordingly, the excess fluid flow now passes disc 381 into and through passage 360 into passage 370, between the primary and secondary filter elements. Thus, the excess flow by-passes the primary filter element 340, and, passing through only the secondary filter element 350, emerges into the passage 375 enclosed by the secondary filter element, thence leaving the filter bowl 316 at port 303 via passages 374 and 331. In the course of such flow, it is thoroughly mixed with the filtered flow, which continues to pass through the primary filter element 340. The fluid now delivered by the filter unit to the system is therefore composed of fluid passing through the primary filter element, and thus effectively stripped of all particles more than 3 microns in diameter, together with flow passing only through the secondary filter element, and stripped only of particles in excess of 15 microns in diameter.

The system can tolerate such a mixed flow for a considerable period of time, but as a matter of fact this flow is continued only for so long as the excess flow demand is made upon the system. As soon as the flow demand diminishes, and the volume of fluid and rate of flow is restored to normal, the pressure differential across the primary element 340 is correspondingly decreased. When the fluid pressure differential has been reduced to below that at which the pressure-sensitive spring disc valve 381 is opened, the valve returns to its seat. Direct passage to the secondary element 350 is accordingly closed off, and all flow by-passing the primary filter element ceases. All the filtered flow accordingly is subjected to the action of the primary filter element 340, and all particles in the system larger than 3 microns in diameter are now removed. Since all of the fluid circulating in the system is eventually recirculated through the primary filter element, any particles which may have escaped the secondary filter element because they are smaller than can be removed thereby, that is, any having a particle size within the range from 15 microns down to 3 microns, will now be removed from the fluid by the action of the primary filter element. Thus, the presence of such particles in the fluid is only temporary, during the period of excess flow requirements.

In the course of use, as the amount of material removed by the primary filter element increases, flow through the primary filter element becomes obstructed. As this happens, the fluid pressure differential across the disc valve 381 increases, due to the reduction in flow volume through and on the other side of the filter element. This results in a corresponding increase in the pressure differential across the valve 381, which communicates with the space 370 between the primary and secondary filter elements. Eventually the fluid pressure applied to the valve 381 exceeds the predetermined pressure at which the valve disc 381 will open, and the disc is then pushed away from the seat, thus exposing passage 372 to the flow of fluid. If desired, the spring disc 381 can be designed so that the amount of opening can be proportional to the differential fluid pressure upon the disc. Thus, flow can continue through the primary filter element for as long a period as possible, until it is plugged completely. At this point, or shortly before, the valve 381 is then fully opened, and all flow by-passes the primary filter element, to pass only through the secondary filter element. Up until that point, only a portion of the flow passes through valve 381, but the proportion is sufficient to maintain the required flow volume to be delivered at the outlet port 303.

With the plugging of the primary filter element 340, and the corresponding reduction in pressure observed in passage 372, the pressure differential thus produced is detected by differential pressure indicator 290, which, at a pressure differential at or preferably just short of the time of opening of the valve 381 to expose passage 372, signals that the primary filter element is clogged. Thus, the operator is made aware of the condition requiring his attention at or before the time when the secondary filter element is put into service, by-passing the primary filter element.

Flow through the secondary filter element 350 into space 375 will continue until the secondary filter element becomes clogged. In the unlikely event that this should occur, the spring disc valve 386 provides a by-pass around the secondary filter element 350. As the secondary filter element 350 becomes obstructed, due to the removal of contaminants, the pressure differential between passage 360 and space 372 will increase, and eventually it reaches the point at which the disc 386 is forced away from its seat, opening a passage from passage 360 to passage 374. Just before the pressure reaches that point, the change in pressure between passage 307 of the head, and passage 374, which is in direct connection with passage 331 of the head, is detected by the pressure indicator 295, which is in direct communication therewith through passage 296 and passage 297, respectively. Accordingly, a signal is given at a pressure differential just before the pressure differential required to open the disc valve 386. The operator now sees the signal of the pressure indicator 295, and knows that both filter elements of the filter unit are out of service, so that servicing of the unit is imperative if satisfactory operation of the hydraulic system is to be continued.

Any type of relief valve can be used in place of the spring disc valves 381 and 386, such as a poppet and spring type valve. The pressure indicators 290 and 295 are arranged to be actuated only at abnormal pressure drops or differential across the primary and secondary filter elements, respectively. This is easily accomplished by adjustment of the biasing force in springs 316 and 331, for example. Indicator 290 is also not actuated by a surge in flow volume unaccompanied by a very large increase in total pressure due to the venturi 306. At a surge in flow, flow velocity is increased at the passage 306, with a resultant increase in velocity head and a decrease in static head. Consequently, this surge does not increase the static head tending to actuate the piston 314, but decreases it.

However, as the primary filter element becomes clogged, the flow volume through the venturi 306 decreases, and with this, there is a decrease in velocity through it, while the total pressure on the inlet side of the filter element increases. In this case, a proportionate increase in static pressure is communicated to the top of piston 314, since the total pressure is not now converted into velocity head, and eventually the pressure differential across piston 314 reaches the predetermined minimum, whereupon the indicator button 328 is released, and rises to an indicating position. Thus, while false readings are prevented in the case of surges in flow while the primary filter element is not clogged, clogging of the filter results surely in an actuation of the indicator.

While the indicator 295 is not connected to the venturi 306, it could be, and in this case it too would not be actuated by flow surges after the primary element has been plugged and the secondary element is the only element in service.

The spring disc used in the filter assemblies of the invention are in the form of a disc bowed against the direction of flow, and are selected to open fully at a predetermined pressure differential. The flow-through required is provided by so dimensioning the disc and valve seat as to give an annular opening of the predetermined flow capacity when the disc cracks open. Disc thickness, amount of bow, disc diameter and annular opening diameter are determined by the pressure differential to be resisted, i.e., the resistance to be offered by the spring action of the disc, and the flow capacity needed at a given pressure differential.

The spring disc of the invention is made of material of high yield strength and high hardness. Materials having minimum yield strengths of 30,000 to 400,000 p.s.i., can be used, with Rockwell hardness of the order of C–45. Steel, stainless steel, and nickel chromium alloys are satisfactory, as also are certain synthetic resins such as polytetrafluoroethylene and polyoxymethylene.

When the spring disc is made of metal, it can, if desired, be coated with a thin layer of a resilient material to aid in sealing off leakage of fluid through the valve when the disc is in engagement with the valve seat. The resilient coating can extend over the entire disc or over only that portion of the disc in contact with the value seat. The resilient coating is preferably made of a polymeric material, which can be either plastic or elastomeric. Representative coating materials include natural rubber, any of the synthetic rubbers such as SBR, butyl rubber, neoprene, and polybutadiene, polyhalocarbons such as polytetrafluoroethylene (Teflon) and polytrifluorochloroethylene (Kel-F), polyolefins such as polyethylene and polypropylene, and chlorinated polyolefins, as well as polyvinyl chloride. The coating material, if any, should be inert to the fluid used in the system, and be capable of withstanding the temperature of operation.

The disc can be uniform in thickness throughout or can vary in thickness, thinner at the center than at the edge, to give improved flexing and sealing.

Fluid flow conditions of all kinds can be met by appropriate design of the spring disc to any load-deflection characteristics required in the system. The geometry of these discs is established by the discs' outside diameter and inside diameter, its free height measured from the inside edge (along the perpendicular to the outside edge and its thickness. Proper selection of the geometry, using mathematical tables and equations of Fortini, Machine Design, Sept. 4, 1958, "Conical-Disc Springs" will give a disc capable of pressure-relieving response to any type of load in any desired way.

Figure 7A:
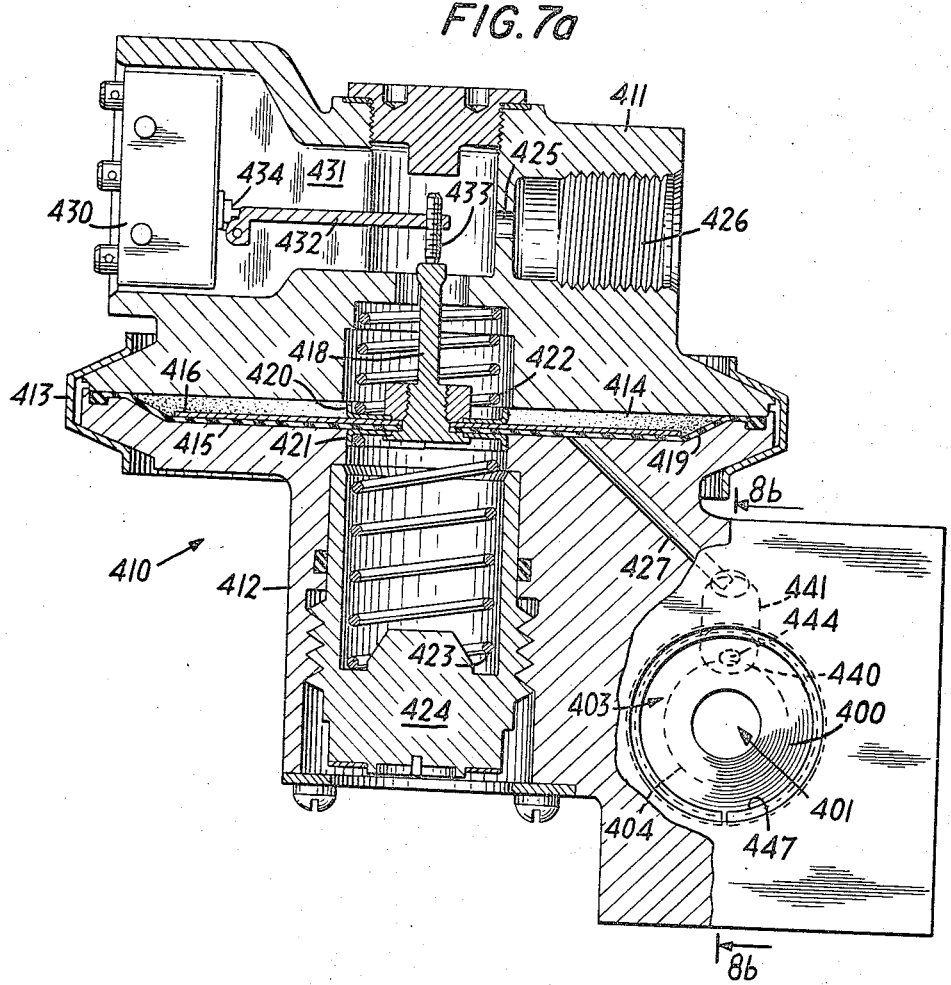
FIG. 7a is a partial longitudinal section taken of another embodiment of the pressure indicator of the invention, utilizing an orifice as the response control means and arranged to isolate the pressure indicator from the line in the event of a flow surge above a predetermined flow rate.
Figure 7B:
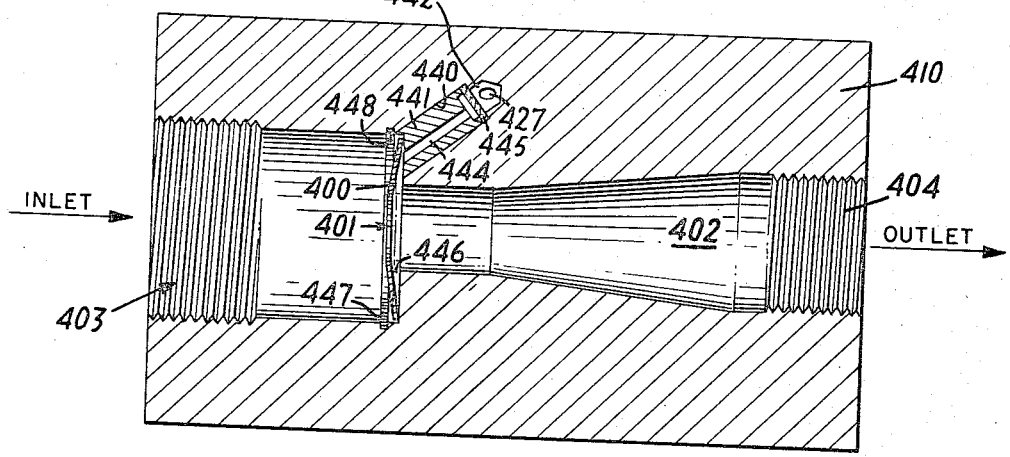
FIG. 7b is detailed section along the line 8b—8b of FIG. 7a and looking in the direction of the arrows.

The differential pressure indicator of FIGS. 7a and 7b employs an orifice as the response control means in the form of a Belleville washer which also serves as a valve which closes automatically under the pressure of a flow surge above a predetermined rate. The indicator, which is of a non-magnetic type, is thus cut entirely out of the line at such times.

The response control means is the Belleville washer 400 having a central orifice 401, and inserted within flow passage 402 of the housing 410. The orifice converts static head into velocity head and here acts to make the indicator insensitive to flow surges by cutting it out of the line. Fluid enters the flow passage through inlet port 403 and leaves through outlet port 404, both fitted with suitable pipe connections.

At one side of flow passage 402 is a socket 440 within which is fitted, as by a press fit, an insert 441. The insert defines a chamber 442. Opening into socket 440 is passage 427, communicating with the high pressure side of the differential pressure indicator and is thus part of the Δ tap of this embodiment. Also opening into socket 440 is passage 444 which communicates with the vena contracta of the orifice and is thus also part of the Δ tap of this embodiment. Optionally, a porous or permeable snubber disc 445, preferably of sintered stainless steel, may be inserted within socket 440 at the entrance to passage 427, so as to smooth out short duration pressure ripples caused by minor flow variations. The disc 443 does not otherwise affect the indicator's response.

The washer 400 is normally in the position shown, bowed away from the upstream face of the insert 441. In this position, there is a gap 446 between washer 400 and insert 441 exposing passage 444. Gap 446 taps the static pressure adjacent the vena contracta of the orifice and the Δ tap of the indicator is thus connected to the Δ static head zone. Whenever there is a flow surge above a predetermined level, however, the annular spring disc flexes towards the insert 441 and eventually flexes sufficiently to assume the position shown by the dotted lines. In this position, the washer is flush against the insert, thus sealing off passage 444, isolating the Δ tap from the indicator. If desired, the sealing may be improved by providing an O-ring seal (not shown) in the face of the insert between the passage 444 and the flow passage 402. Sealing may also be improved by coating the washer with a natural or synthetic elastomer or plastic such as, for example, polytetrafluoroethylene or neoprene or Buna N.

Instead of a socket cut into the wall of the housing, an annular groove within which an annular insert is placed, can be used. A plate with an orifice which is biased away from the valve seat on the upstream face of insert 441 by a separate bias means such as a coil spring or annular spring disc can also be used. The piece 400 defining the orifice with either construction is held in position adjacent to insert 441 in a manner to permit reciprocation between closed and open positions, such as in the embodiment illustrated, by a split washer 447 inserted within groove 448 in flow passage 402.

The flow passage downstream of insert 441 is preferably of gradually increasing diameter, as shown, to reduce the total pressure drop through the flow passage.

As in the case of the pressure indicators shown in FIGS. 1 through 4, flow passage 402 can in many cases carry the entire flow passing through the system. However, where large flow volumes are expected, it may be desirable to provide a by-pass line for the major portion of the flow and pass only a minor portion thereof through flow passage 402. In this way the indicator housing dimensions can be standardized and still be capable of meeting the flow requirements of any system.

The differential pressure-responsive switch of FIGS. 8a and 8b comprises a housing 410 formed in upper and lower portions 411 and 412, respectively, held together by a V-band clamp 413. The upper and lower portions of the housing between them define a chamber 414 provided with a lower wall 415 matching a plate 416. Supported on the plate 416 between it and enlarged head 417 of the rod 418 is a flexible rubber diaphragm 419 in a liquid-tight seal. The attachment between the diaphragm 419 and the plate 416 can be improved, if desired, by bonding the two together. The assembly of the plate 416, rod 418 and diaphragm 419 together constitutes a diaphragm means since all respond together to pressure-actuated movement of the diaphragm 419. The diaphragm may be formed of any flexible material, such as, for example, a flexible metal sheet or a flexible synthetic resin or cellulose derivative such as rubber, cellulose acetate, polytetrafluoroethylene, polypropylene, polyethylene, or polyvinylidene chloride.

The outer periphery of the diaphragm 419 is held in the joint between the two portions 411 and 412 of the housing in a liquid-tight seal. Thus, fluid is prevented from passing from one side of the diaphragm to the other, and from inside the housing to the outside. The diaphragm, plate and rod are free to move within the chamber 414, the rod being reciprocatingly supported upon the diaphragm 419. A pair of cup-shaped washers 420 and 421 locate a pair of coil springs 422 and 423. Spring 422 urges the diaphragm assembly toward the wall 415. The coil spring is selected according to the desired actuating pressure differential to permit the diaphragm assembly to move upwardly whenever the pressure at the lower surface of the diaphragm 419 exceeds that at the upper surface by an amount equal to the actuating pressure. The spring 423 assists upward movement of the diaphragm assembly by an amount determined by the spring characteristics and by the position of the adjusting screw 424. The screw is set so as to insure response of the device by movement of the diaphragm at the desired pressure differential. The large surface of the diaphragm provides great sensitivity to small changes in pressure differential across the faces of the diaphragm.

Introduction of fluid within the chamber 414 to both sides of the diaphragm 419 is by way of passage 425 and port 426 in the upper portion 411 of the housing, giving access to the portion of chamber 414 above the upper face of the diaphragm, and by way of passage 427 in the lower portion 412 of the housing, giving access to the lower face of the diaphragm. Port 426 is in turn connected to the fluid system or systems downstream of the point across which the differential pressure is to be detected by the pressure indicator, as, for example, to the outlet of a filter (not shown) to detect the pressure drop across the filter. Passage 427 is the Δ tap of this embodiment of the indicators of the invention and thus communicates with the response control means, washer 400.

In this embodiment of the invention, the pressure indicator is adapted to provide an electrical signal when the pressure condition is such as to actuate the indicator, so as to warn of a clogged filter or to stop fluid flow.

A switch 430 is mounted in a recess 431, and affixed to the upper portion 411 of the housing. Also mounted in the recess is a lever 432, pivotally supported on the housing so as to extend above the rod 418. Attached to one end of the arm 432 is a set screw 433, and attached to the other end of the arm is a switch actuator 434 movable by the arm to actuate the switch 430 when the rod 418 rises into contact with the screw 433 and sufficiently moves arm 432. In order to restrict the motion of the diaphragm and prevent it from rising so far as to damage itself or the switch, the top wall of chamber 414 of the housing is low enough to intercept the diaphragm 419 at a limiting position. This position is such that the indicator is automatically reset upon return of the diaphragm 419 to the normal position. To provide a remote signal of actuation of the indicator, suitable conductors (not shown) from the switch 430 can be arranged in any conventional manner to complete appropriate electrical circuits whenever the switch is operated or reset.

In operation, fluid under pressure enters inlet port 403 and flows through flow passage 402 to the orifice 401, through the orifice, and emerges from the indicator at outlet port 404. Static pressure is communicated from the vena contracta of the orifice through the gap 446 and then through passages 444 and 427 to the upstream side of the diaphragm indicator assembly, and from the other side of the assembly via port 426 and passage 425 to a point downstream of the orifice 401.

As a consequence of the reductoin in diameter at the orifice 401, the velocity of flow there increases, resulting in a decrease in static head there.

At normal flow rates, the force exerted by the fluid's impact against the washer 400 is insufficient to flex it sufficiently to close gap 446 and to seal off passage 444. Hence, the Δ tap, comprising the gap 446, passage 444, socket 440 and passage 427, remains open and the indicator can and does actuate whenever the downstream pressure falls below a predetermined level.

However, in a flow surge, when the flow volume and hence rate increases to above a predetermined level, the force exerted by the fluid on the upstream face of the washer is sufficient to cause the washer to flex. Eventually, the washer flexes to the position shown by the dotted lines in FIG. 7b, i.e., flush against the face of insert 441, thereby closing gap 446, and sealing off passage 444.

Whenever the flow rate falls below this surge level, the force exerted on the face of the washer is reduced, so that the spring action of the washer returns it to the normal open position away from insert 441, once again opening gap 446 which then is exposed to the static pressure at the vena contracta of the orifice.

Whenever the washer is in the open position shown in FIGURE 8a, the static head at the vena contracta of the orifice is communicated through gap 446 to passage 444 to socket 440 and thence to passage 427. The pressure is communicated through the passage 427 to the bottom of the chamber 414 below the diaphragm, urging the diaphragm 419 and the rod 418 upwardly against the force of the spring 422, and the fluid pressure above the diaphragm, communicated through passage 425 and port 426. Whenever the difference between the pressures across the diaphragm is greater than the differential force of the springs 422 and 423, the diaphragm assembly is driven upwardly, and the rod 418 contacts and lifts the screw 433, thus raising the lever 432 to actuate the switch 430 through application of pressure through the switch actuator 434. When the diaphragm 419 is fully deflected, it contacts the top of chamber 414, which serves as a stop to prevent further deflection, and prevents damage from overpressuring. Return of the diaphragm to its normal position upon correction of the excessive pressure differential draws the diaphragm back toward the wall 415, restoring the switch.

The following is claimed:

1. A differential pressure indicator relatively insensitive to flow surges in a first source of fluid pressure, comprising, in combination, a housing; first and second fluid lines associated with the housing and communicating with first and second sources of fluid pressure, respectively; indicating means mounted in the housing between the first and second fluid lines for movement to and from an indicating position in response to a predetermined static pressure differential between the fluid lines; and a flow control passage having a constricted portion for flow of fluid of the first source of fluid pressure therethrough, and dimensioned to increase velocity head and decrease static head of such flow; said first fluid line communicating with the first source of fluid pressure at the constricted portion of the flow control passage, to tap only such decreased static pressure to the indicating means, thereby preventing response of the indicator to flow surges.

2. A differential pressure indicator in accordance with claim 1, wherein the passage is in an inlet passage of the housing.

3. A differential pressure indicator in accordance with claim 1, in which the passage is a venturi and the constricted portion is the throat of the venturi.

4. A differential pressure indicator in accordance with claim 1, in which the constricted portion of the passage is an orifice.

5. A differential pressure indicator in accordance with claim 1, including a switch operable by movement of the indicating means to an indicating position.

6. A filter assembly comprising, in combination, a housing having an inlet and an outlet; a filter element disposed in the housing in a manner to receive the fluid or filtration from the inlet and deliver filtrate fluid to the outlet, a flow control passage disposed in the line of flow from the inlet to the filter element, said passage having a constricted portion dimensioned to increase velocity head and decrease static head of such fluid, a differential pressure indicator having a first fluid line connected to the constricted portion of the passage and communicating only static head at said constricter portion to the pressure indicator, a second fluid line communicating with the downstream side of the filter element and with the indicator, indicating means mounted in the indicator for movement to and from an indicating position and responsive to changes in static pressure between the two fluid lines, thereby preventing response of the indicator to flow surges.

7. A filter assembly in accordance with claim 6, in which the passage is a venturi, and said constricted portion is the throat of the venturi.

8. A filter assembly in accordance with claim 6, in which the constricted portion is an orifice.

9. A filter assembly in accordance with claim 6, including a secondary filter element disposed in the housing in line of flow from the primary filter element to the outlet, a bypass line in the housing leading from the inlet to the secondary filter element in a manner to bypass the primary filter element, and a valve adapted to close off the bypass line under normal conditions but responsive to a predetermined pressure differential across the primary filter element to open and permit flow to pass directly to the secondary filter element from the inlet.

10. A filter assembly in accordance with claim 9, wherein the second fluid line communicates with a space on the downstream side of the primary filter element upstream of the secondary filter element, and detects a pressure differential across the primary filter element.

11. An indicator in accordance with claim 6, in which the indicating means includes a magnetic means for retaining the indicating means in a nonindicating position until a predetermined pressure differential between the two fluid lines is reached.

References Cited
UNITED STATES PATENTS

| | | | |
|---|---|---|---|
| 2,558,534 | 6/1951 | Bentley | 73—407 X |
| 3,077,176 | 2/1963 | Pall et al. | 210—90 X |
| 3,262,563 | 7/1966 | Pall | 210—90 |

SAMIH N. ZAHARNA, *Primary Examiner.*